United States Patent Office 3,568,301
Patented Mar. 9, 1971

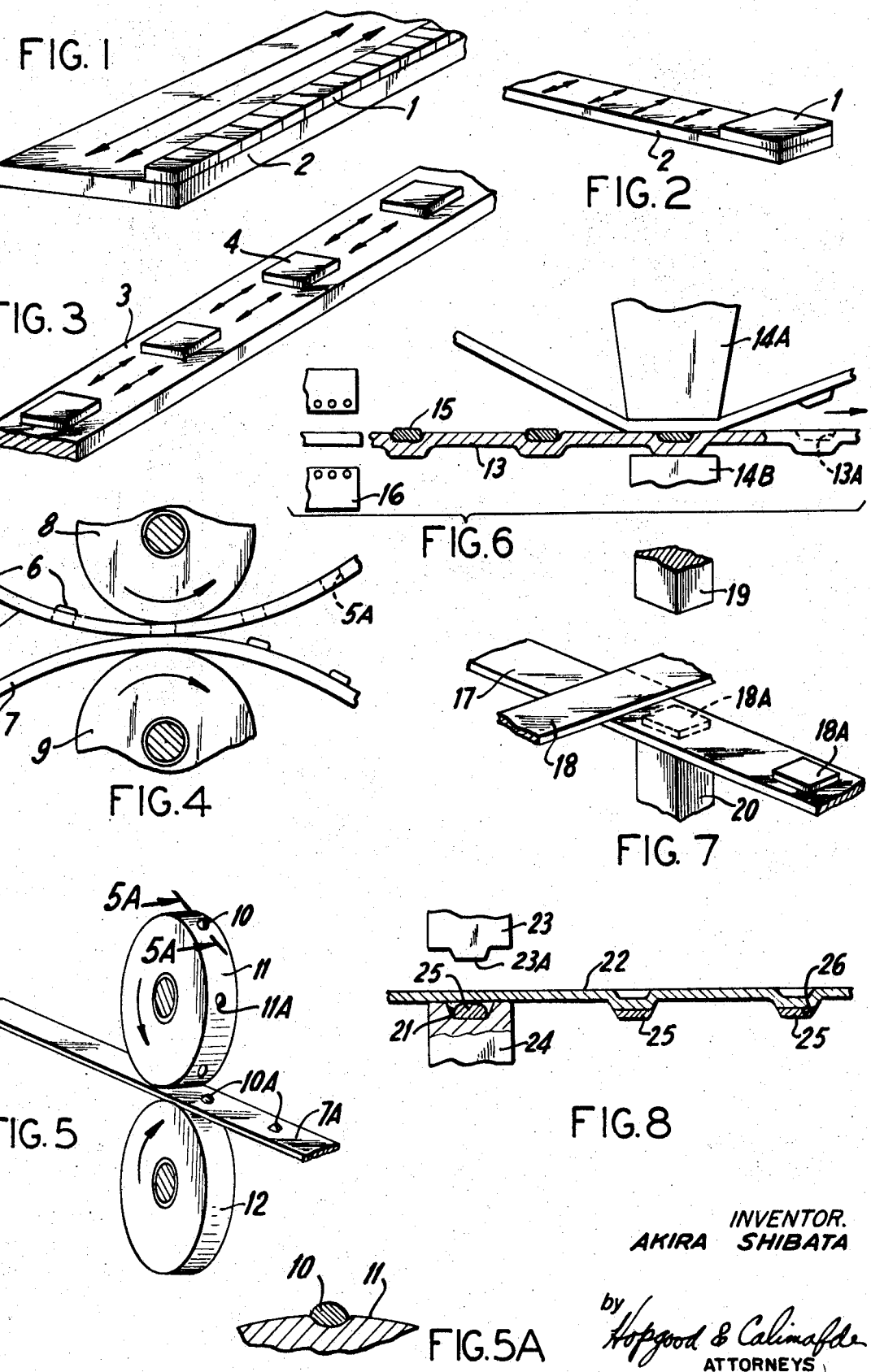

3,568,301
BONDING OF PRECIOUS METAL TO A METAL
SUBSTRATE AND PRODUCT THEREFOR
Akira Shibata, Tokyo, Japan, assignor to Chugai
Electric Industrial Co., Ltd., Tokyo, Japan
Filed Jan. 2, 1969, Ser. No. 788,582
Claims priority, application Japan, Mar. 30, 1968,
43/20,714
Int. Cl. B23k 31/02
U.S. Cl. 29—471.3                        9 Claims

ABSTRACT OF THE DISCLOSURE

A method is provided for producing a composite metal strip comprising a metal substrate with pieces of precious metal bonded thereto in spaced positions in the longitudinal direction of the strip. The method comprises feeding a cold metal substrate strip to a bonding station comprising a lower die support on which the strip is supported and a pressure-applying die disposed above said supporting die, progressively feeding pieces of precious metal to between said upper and lower dies, and immediately applying bonding pressure sequentially to each of said pieces sufficient to deform each piece at least 20% of its height while the piece is at a temperature above its recrystallization temperature but below its melting point, whereby each of the pieces is metallurgically bonded to the cold substrate strip in spaced positions along the strip with substantially no alloy diffusion zone at the bonding interface of the composite.

---

This invention relates to a method for producing composite metal products and, in particular, to a method for producing electrical contact elements or terminals and the product produced by the method.

It is known to produce composite metal in which a precious metal is bonded to a substrate, particularly for use as electrical contact elements or terminals, among other uses. A conventional method for manufacturing contact elements is to bond the precious metal to a base metal or substrate by alloying the precious metal to the base metal. A disadvantage of this method is that alloying at the bonding interface adversely affects the electrical conductivity of the precious metal as a contact element. Economically, it is desirable to save precious metal. This is achieved by substituting a portion of the precious with base metal and trying to retain the inherent properties of the precious metal, such as by top-lay, inlay, overlay, side-lay, edge-lay, and the like, wherein plates or bands of precious metal are bonded in a rolling direction to preselected portions of metal substrate, such as copper, brass, nickel silver and the like.

The present invention has as its principal object to produce a functionally improved electrical contact element while providing a saving in precious metal.

Another object is to provide a method wherein pieces of precious metal are separately but sequentially hot bonded on a cold strip of metal substrate in predetermined spaced positions along the metal strip, while avoiding or minimizing alloying between the precious metal and the substrate at the bonding interface.

These and other objects will more clearly appear from the following disclosure and the accompanying drawings, wherein:

FIG. 1 is illustrative of a top-lay of precious metal on a metal substrate layed down in the direction of rolling;

FIG. 2 is a view showing a segment of a top-lay cut perpendicularly to the rolling direction of FIG. 1;

FIG. 3 depicts an example of precious metal bonded composite plate or strip in which pieces of precious metal are bonded to a strip of metal substrate at predetermined spaced positions; and FIGS. 4 through 8 depict various preferred embodiments which may be employed in carrying out the method of the invention.

The precious contact metals to which this invention is directed include the ductile precious metals silver, platinum, gold and palladium and alloys based on these metals; while the metal substrate includes copper and copper alloys, e.g. brass, phosphor copper, etc., nickel, nickel-copper alloys, nickel silver, and the like.

FIG. 1 shows typically an example of a top-lay comprising a band or strip of precious metal 1 bonded to a band or strip of base metal or substrate 2. The arrows are indicative of the direction of rolling. As will be apparent from the drawing, the rolling direction and the longitudinal direction of the band of precious metal are parallel. When the precious metal is used as a contact element or terminal, the band is generally cut into a segment or element perpendicular to the rolling as shown in FIG. 2.

According to the invention, a method is provided in which a piece of precious metal is pressure bonded in spaced relation in the longitudinal direction of the base metal strip on one or both sides thereof as shown in the direction of rolling of FIG. 3.

Stating it broadly, the method of the invention resides in feeding a cold base metal substrate strip to a bonding station comprising a lower die support on which the base metal strip is supported and a pressure-applying die disposed above the supporting die, progressively feeding pieces of precious metal to between the upper and lower dies, and immediately applying bonding pressure sequentially to each of the pieces at the bonding station sufficient to deform the piece at least 20% of its height while the piece is at a temperature above its recrystallization temperature but below its melting point, whereby each of the pieces is metallurgically bonded to the cold base metal substrate or strip in spaced position along the strip with substantially no perceptible alloying occurring at the bonding interface of the composite. The pieces of precious metal are preferably fed to bonding stations with each releasably supported in a molding cavity having both top and bottom openings, each of the cavities being configurated to carry the pieces and yet allow the precious metal to be released to the substrate during pressure bonding.

A first embodiment of the invention is illustrated in FIG. 4 which shows a band of steel 5 with cavities 5A in which are supported, depending on the configuration, pieces of precious metal 6. The steel band or carrier may have a thickness of about 0.1 mm. to 1 mm. The steel carrier strip or band 5 is fed to the bonding station comprising upper and lower die rolls 8 and 9, respectively, simultaneously with the feeding of substrate strip 7 of copper, nickel or alloys thereof, which is preferably maintained at room temperature. The steel carrier strip or band, including the precious metal, is previously heated to a temperature above the recrystallization temperature of the metal, the amount of precious metal being sufficient to provide a height greater than the depth of the cavity so that the pressure-applying die roll 8 makes full pressure contact with the piece of precious metal to effect a reduction in height of at least 20% while the piece is releasably pressure-bonded to the cold substrate. Alternatively, pressure-applying die roll 8 may be heated to a temperature sufficiently high to heat the precious metal to above its recrystallization temperature during the application of pressure. In some cases, both the belt-like steel strips 5 and 8 may be heated so long as the metal substrate is maintained substantially at ambient temperature so as to minimize as much as possible any alloying from occurring at the interface between the precious metal and substrate.

It is desirable that steel strip 5 have an oxide film on its surface so as to avoid any bonding of the heated carrier strip to the metal substrate during applied pressure. Such an oxide is formed by heating the steel strip in an atmosphere which is oxidizing to the steel. The precious metal, on the other hand, does not or is hardly oxidized when heated to the same temperature as the steel strip and, therefore, precious metal 6 is bonded completely at its contact face to substrate 7. Since the metal substrate 7, e.g. copper, during bonding is at ambient temperature, it is substantially free from an oxide film so that bonding between the precious metal and the substrate is easily promoted. Thus, as oxidized steel strip 5 with the pieces of precious metal 6 carried in molding cavities 5A is brought in abutting relation with substrate 7 and the assembly fed to between rolls 8 and 9, the pieces 6 are sequentially pressure-bonded to the substrate in spaced relation in the longitudinal direction of the substrate. With this method, substantially every piece of precious metal is bonded completely to the substrate material.

A particular advantage of this method is that because the bonding temperature is above the recrystallization temperature but below the melting point of the precious metal, fusion is avoided at the bonding interface and a clean face-to-face bonding is achieved with substantially no alloying occurring. This type of bonding distinguishes over the type of bonding characteristic of spot welding. A further advantage of the method of the invention is that the composition of the precious metal is not changed as occurs with brazing or other types of welding, including resistance welding, which uses silver brazing metals and fluxes to effect bonding. Since the invention provides a clean weld at the bonding interface, high electrical conductivity is assured for the contact metal.

By applying the precious metal in the rolling direction of the substrate metal strip, the spring quality of the substrate is advantageously used when the composite material is used as a contact element (FIG. 2).

As illustrative of additional embodiments of the invention, the following examples are given:

EXAMPLE 1

Globular pieces 10 of a gold and silver alloy (70% Au—30% Ag) having an average diameter of about 2 mm. are pressure-bonded to a nickel silver substrate 7A (eg. 54% Cu—16% Zn—30% Ni) by inserting the globular pieces in molding cavities 11A or roll 11, the cavities being hemispherical in shape and having a diameter of about 2.5 mm. Since the cavities are about 1.25 mm. deep, about 0.75 mm. of globular piece 10 extends above the periphery of roll 11 (note FIG. 5A) to allow for deformation of at least about 20% of reduction in thickness, which in this example is about 37.5% based on the original thickness of 2 mm. of gold alloy 10. The gold alloy is heated to about 400° C. to 500° C. either before it is deposited into the molding cavity or pressure roll 11 itself is maintained at a temperature sufficiently high to insure heating the gold alloy to the foregoing temperature range, the temperature being above recrystallization temperature of the alloy. Bottom roll 12 may preferably be water cooled to insure maintaining the nickel silver substrate 7A at ambient temperature during pressure bonding. As the substrate is fed through the rolls, the pieces are bonded to provide spaced contact metal 10A in spaced relation along the longitudinal direction of the metal substrate 7A.

EXAMPLE 2

In the embodiment of FIG. 6, a steel belt or strip 13 having a thickness of about 1 mm. and provided with molding cavities 13A spaced 20 mm. apart is employed in delivering the contact metal pieces to the metal substrate at the bonding station. The cavities are about 0.2 mm. deep and 3 mm. wide. A piece of platinum 15 is inserted in each of the cavities, the platinum being 2 mm. square and having a thickness of about 0.33 mm. The steel strip or carrier 13 with the contained platinum pieces is heated to about 500° C. in furnace 16 and the heated strip then fed to between dies 14A and 14B simultaneously with a substrate strip of beryllium-copper fed at ambient temperature, upper dies 14A being brought down at a pressure against the superposed strips sufficiently to deform the platinum pieces from a height of 0.3 mm. to 0.2 mm. or about a reduction of 33% based on the original thickness. The platinum is thus metallurgically bonded to the berylium-copper substrate, each of the bonded pieces conforming to the shape of the molding cavity and being spaced apart along the beryllium-copper strip in the longitudinal direction.

EXAMPLE 3

In another embodiment shown in FIG. 7, pieces of silver 18A from silver strip 18 are bonded to a substrate strip of Phosphor bronze 17 (e.g. 5% tin, 0.02% phosphorous and the balance copper). The silver strip which is about 0.5 mm. thick and 6 mm. wide is disposed at right angles to substrate 17, then cut to square pieces 6 mm. on each side by means not shown and immediately impact-bonded by punch 19 of hard metal (e.g. high speed steel of the 18W–4Cr–1V type) which is heated to a temperature of about 600° C. The silver piece during impact is immediately heated to above its recrystallization temperature and is deformed to a thickness of about 0.3 mm. (about 40% based on the original thickness) and a length and width of approximately 7.5 to 8 mm., the deformed piece being strongly bonded to the Phosphor bronze substrate.

EXAMPLE 4

In the example illustrated by FIG. 8, the precious metal piece is supported in a molding cavity 21 of lower die 24, the substrate 22 being a belt or strip of brass having a thickness of 0.5 mm. and a width of 5 mm. The precious metal 25 is an alloy of platinum, gold and silver containing 40% Pt, 50 Au and 10% Ag. The pieces of precious metal are about 3.8 mm. in diameter and about 1 mm. thick. Punch 23 has a front face extension 23A which conforms to the shape of cavity 21 of lower punch or die 24, the lower punch being heated to a temperature of about 500° C. As substrate 22 is indexed in position over lower punch 24, the upper punch is brought down at an impact pressure sufficient to press a portion of the brass strip into cavity 21 and deform the precious metal more than 20% in thickness (i.e. from 1 mm. thick to 0.7 mm. thick). Thus, the substrate has formed within it a cavity having a diameter of about 4 mm. and a depth of about 0.5 mm., the outside bottom face 26 of the cavity having bonded to it the precious contact metal. After completing the bonding operation, the precious metal pieces 25 are spaced longitudinally along the brass substrate strip.

As stated herein, the method of the invention is applicable to contact metals selected from the group consisting of silver, platinum, gold, palladium and alloys based on these metals. Examples of such alloys are: 10% Cd and the balance Ag; 90% Ag—10% CdO; 90% Ag—10% Ni; 70% Ag—30% Pd; 74.5% Ag—25% Au—0.5% Ni; 95% Ag—5% Ni; 90% Ag—10% Cu; 72% Ag—26% Cu—2% Ni; 97% Ag—3% Pd; 97% Ag—3% Pt; 95% Pt—5% Ir; 85% Pt—15% Ir; 90% Pt—10% Ru; 96% Pt—4% W; 90% Pd—10% Ru; 70% Pd—30% Ag; 72% Pd—26% Ag—2% Ni;

45% Pd—30% Ag—20% Au—5% Pt; 90% Au—10% Cu; 75% Au—25% Ag; 69% Au—25% Ag—6% Pt; 41.7% Au—32.5% Cu—18.8% Ni—7% Zn; and the like electrical contact alloys. The foregoing compositions are merely illustrative of electrical contact metals based substantially on the precious metals Ag, Pt, Au and Pd.

As stated with respect to the substrate metals, these may include nickel, copper, nickel-base and copper-base alloys, such as nickel silver, nickel-copper alloys (e.g. 60% Ni—40% Cu); alloys of copper-zinc, beryllium-copper, copper-phosphorous, and the like.

Nickel silver, otherwise known as German silver, may comprise 45 to 65% copper, 15 to 40% zinc and 8 to 35% nickel. A typical example of nickel silver is one containing 55% copper, 25% zinc and 20% nickel. The following alloys are available in sheet or strip form: 54% copper, 16% zinc and 30% nickel; 58% copper, 24% zinc and 18% nickel; and 60% copper, 30% zinc and 10% nickel.

Typical copper-zinc alloys include those falling in the range of 5 to 40% zinc and the balance copper. The beryllium-copper alloys include those containing about 1% to 3% of beryllium and the balance substantially copper; while the copper-phosphorous alloys may contain about 0.02% phosphorous and the balance substantially copper, said alloys also containing up to 10% tin.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of producing a composite metal strip comprising a metal substrate with pieces of precious metal bonded thereto in spaced positions in the longitudinal direction of the strip which comprises, feeding a cold metal substrate strip to a bonding station comprising a lower die support on which the strip is supported and a pressure-applying die disposed above said supporting die, progresively feeding pieces of precious metal to between said upper and lower dies, and immediately applying bonding pressure sequentially to each of said pieces sufficient to deform said piece at least 20% of its height while said piece is at a temperature above its recrystallization temperature but below its melting point, whereby each of said pieces is metallurgically bonded to the cold substrate strip in spaced positions along said strip with minimum alloy diffusion zone at the bonding interface of the composite.

2. A method of producing a composite metal strip suitable for use as electrical contact metal comprising a metal substrate with pieces of precious metal bonded thereto in spaced positions in the longitudinal direction of the strip which comprises, feeding a cold metal substrate strip to a bonding station comprising a lower supporting die on which the strip is supported and a pressure-applying die disposed above said supporting die, providing a piece of precious metal releasably supported within a molding cavity between said dies and adjacent said metal substrate, immediately applying bonding pressure simultaneously to said substrate and said piece of precious metal while said precious metal is at a temperature above its recrystallization temperture and below its melting point sufficient to deform said piece at least 20% of its height, whereby said piece is metallurgically bonded to said substrate with minimum alloy diffusion at the bonding interface, and repeating said operation with another piece of precious metal while the substrate is moved to a new bonding position.

3. The method of claim 2, wherein the precious metal is selected from the group consisting of Ag, Pt, Au, Pd and alloys based on these metals, and wherein the metal substrate is selected from the group consisting of nickel, copper, nickel-base and copper-base alloys.

4. The method of claim 3, wherein the precious metal piece is heated prior to being delivered to the bonding station.

5. The method of claim 4, wherein the precious metal is heated during the application of pressure by a heated die.

6. The method of claim 3, wherein each of the precious metal pieces is delivered to the bonding station while supported on a carrier strip, the metal pieces being in contactable relation with the metal substrae fed to bonding station.

7. The method of claim 3, wherein the metal pieces are fed to the bonding station comprising a pair of opposed rotatable dies in which the metal pieces are contained in molding cavities located in spaced relation around the periphery of the pressure-applying die.

8. The method of claim 6, wherein the precious metal pieces are each releasably contained in molding cavities spaced along the carrier strip.

9. The method of claim 3, wherein the precious metal pieces are sequentially fed to a molding cavity located in the lower die, the substrate being fed over the lower die so that a pressure-applying male upper die causes the precious metal piece to be bonded to the underside of the metal substrate.

References Cited
UNITED STATES PATENTS

| | | | |
|---|---|---|---|
| 3,078,239 | 4/1963 | Clagett | 29—498X |
| 3,170,234 | 2/1965 | Farr | 29—488 |
| 3,181,219 | 5/1965 | Deshaies | 29—630C |
| 3,330,026 | 7/1967 | Best et al. | 29—497.5X |
| 3,340,597 | 9/1967 | Stein et al. | 29—497.5X |
| 3,397,451 | 8/1968 | Avedissian et al. | 29—471.1X |

JOHN F. CAMPBELL, Primary Examiner

R. B. LAZARUS, Assistant Examiner

U.S. Cl. X.R.

29—497.5, 498, 630